Patented Dec. 5, 1950

2,533,086

UNITED STATES PATENT OFFICE 2,533,086

HYDROXYMETHYLTHIANAPHTHENE

Frederick Franklin Blicke, Washtenaw County, Mich., assignor to Regents of the University of Michigan, Ann Arbor, Mich., a corporation of Michigan No Drawing. Application November 19, 1949, Serial No. 128,485

7 Claims. (Cl. 260—330)

This invention relates to 2-hydroxymethylthianaphthene and 3-hydroxymethylthianaphthene and their method of preparation.

2-hydroxymethylthianaphthene and 3-hydroxymethylthianaphthene having the following respective formulas

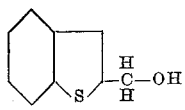 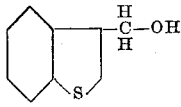

have been found to possess exceptional utility as selective solvents and intermediates for the preparation of various plant growth hormones and other organic chemicals having pharmaceutical properties.

The novel compounds of this invention may be conveniently prepared by reacting the corresponding thianaphthene carboxylic acid, such as thianaphthene-2-carboxylic acid or thianaphthene-3-carboxylic acid, with lithium aluminum hydride. According to a preferred embodiment of this invention, a 1 molecular proportion of the corresponding thianaphthene carboxylic acid is reacted with approximately a 1 molecular proportion of lithium aluminum hydride by boiling the reactants under reflux conditions in a suitable inert organic liquid medium, such as ether.

The following examples are specifically illustrative of the manner in which the novel compounds of this invention may be prepared:

EXAMPLE I

*2-hydroxymethylthianaphthene*

A solution of 11.4 g. of lithium aluminum hydride in 700 ml. of anhydrous ether was prepared in a liter flask to which a Soxhlet extractor was attached. 35.6 g. of thianaphthene-2-carboxylic acid was placed in the extractor thimble and the ether boiled under reflux conditions for 24 hours. After the careful addition of water, 30 ml. of concentrated sulfuric acid in 300 ml. of water was added to the mixture. The layers that formed were separated, and the water layer extracted with ether. The combined ether solutions were washed successively with water, sodium bicarbonate solution and water, dried over anhydrous magnesium sulfate and then fractionally distilled to obtain 2-hydroxymethylthianaphthene. The 2-hydroxymethylthianaphthene thus obtained, after recrystallization from petroleum ether, had the following physical properties:

Boiling point, 123–125° C. at 1.5 mm. Hg absolute
Melting point, 99–100° C.
Analysis:
  Calculated for $C_9H_8OS$, 19.52% S
  Found, 19.45% S

EXAMPLE II

*3-hydroxymethylthianaphthene*

A suspension of 8.9 g. of thianaphthene-3-carboxylic acid in 200 ml. of anhydrous ether was dropped slowly into a boiling solution of 2.7 g. of lithium aluminum hydride in 200 ml. of dry ether during a period of ½ hour. The mixture was cooled, and after the careful addition of water, was treated with a solution of 10 ml. of concentrated sulfuric acid in 100 ml. of water. The reaction mixture separated into two layers. The water layer was extracted with ether. This ether extract was combined with the ether layer of the reaction mixture and the combined ether solutions washed with water, dried, and the ether removed by distillation. From the residue, there was obtained 7.9 g. of 3-hydroxymethylthianaphthene, having the following properties:

Boiling point, 124–125° C. at 1.5 mm. Hg absolute
Analysis:
  Calculated for $C_9H_8OS$, 19.52% S
  Found, 19.31% S

What is claimed is:

1. As a new composition of matter, a compound selected from the group consisting of 2-hydroxymethylthianaphthene and 3-hydroxymethylthianaphthene.

2. 2-hydroxymethylthianaphthene.

3. 3-hydroxymethylthianaphthene.

4. A process for the preparation of a hydroxymethylthianaphthene selected from the group consisting of 2-hydroxymethylthianaphthene and 3-hydroxymethylthianaphthene, which comprises reacting a thianaphthene carboxylic acid selected from the group consisting of thianaphthene-2-carboxylic acid and thianaphthene-3-carboxylic acid with lithium aluminum hydride.

5. A process for the preparation of a hydroxymethylthianaphthene selected from the group consisting of 2-hydroxymethylthianaphthene and 3-hydroxymethylthianaphthene, which comprises boiling under reflux conditions a 1 molecular proportion of a thianaphthene carboxylic acid selected from the group consisting of thianaphthene-2-carboxylic acid and thianaphthene-3-carboxylic acid, with approximately a 1 molecular proportion of lithium aluminum hydride in an inert organic liquid medium, and recovering therefrom said hydroxymethylthianaphthene.

6. The process as described in claim 5 wherein the thianaphthene carboxylic acid is thianaphthene-2-carboxylic acid.

7. The process as described in claim 5 wherein the thianaphthene carboxylic acid is thianaphthene-3-carboxylic acid.

FREDERICK FRANKLIN BLICKE.

No references cited.